(12) United States Patent
Zhang et al.

(10) Patent No.: US 10,146,649 B2
(45) Date of Patent: Dec. 4, 2018

(54) HANDLING A VIRTUAL DATA MOVER (VDM) FAILOVER SITUATION BY PERFORMING A NETWORK INTERFACE CONTROL OPERATION THAT CONTROLS AVAILABILITY OF NETWORK INTERFACES PROVIDED BY A VDM

(71) Applicant: EMC IP Holding Company LLC, Hopkinton, MA (US)

(72) Inventors: Minghui Zhang, Shanghai (CN); Tianfang Xiong, Shanghai (CN); Yuanyang Wu, Shanghai (CN); Yifeng Lu, Shanghai (CN); Hongru Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/715,787

(22) Filed: Sep. 26, 2017

(65) Prior Publication Data

US 2018/0095851 A1 Apr. 5, 2018

(30) Foreign Application Priority Data

Sep. 30, 2016 (CN) .......................... 2016 1 0875867

(51) Int. Cl.
*G06F 11/20* (2006.01)
*G06F 17/30* (2006.01)

(52) U.S. Cl.
CPC ...... *G06F 11/2069* (2013.01); *G06F 11/2023* (2013.01); *G06F 11/2097* (2013.01); *G06F 17/30088* (2013.01); *G06F 17/30215* (2013.01)

(58) Field of Classification Search
CPC ............. G06F 11/2069; G06F 11/2023; G06F 11/2097
See application file for complete search history.

(56) References Cited

U.S. PATENT DOCUMENTS

| 7,302,608 | B1 * | 11/2007 | Acharya | ............. G06F 11/2023 714/13 |
| 7,383,463 | B2 | 6/2008 | Hayden et al. | |
| 7,496,783 | B1 * | 2/2009 | Graf | .................... G06F 11/1456 714/13 |
| 7,721,063 | B2 * | 5/2010 | Ontko | ................. G06F 11/2069 711/114 |

(Continued)

*Primary Examiner* — Edward J Dudek, Jr.
(74) *Attorney, Agent, or Firm* — BainwoodHuang

(57) ABSTRACT

A technique handles a VDM failover situation. The technique involves adjusting a configuration file on a first platform to indicate whether data managed by an initial VDM on that platform is being replicated to a second platform. The technique further involves, following a VDM failover event, creating a replacement VDM on the first platform to replace the initial VDM. The technique further involves, after the replacement VDM is created, performing an operation that controls interfaces provided by the replacement VDM. The operation enables the interfaces when the operation determines that the data managed by the initial VDM on the first platform was not being replicated to the second platform at the time of the event, and disables the interfaces when the operation determines that the data managed by the initial VDM on the first platform was being replicated to the second platform at that time of the event.

20 Claims, 6 Drawing Sheets

(56) References Cited

U.S. PATENT DOCUMENTS

| | | | |
|---|---|---|---|
| 7,734,947 B1 * | 6/2010 | Frangioso | G06F 11/1482 |
| | | | 714/13 |
| 7,769,722 B1 | 8/2010 | Bergant et al. | |
| 8,706,833 B1 | 4/2014 | Bergant et al. | |
| 9,305,009 B1 | 4/2016 | Bono et al. | |
| 9,805,105 B1 | 10/2017 | Bono et al. | |
| 2005/0193245 A1 * | 9/2005 | Hayden | G06F 11/2069 |
| | | | 714/13 |
| 2012/0030323 A1 * | 2/2012 | Matsuno | G06F 11/2023 |
| | | | 709/221 |
| 2016/0105313 A1 * | 4/2016 | Jha | G06F 11/1451 |
| | | | 709/217 |
| 2016/0306719 A1 * | 10/2016 | Laicher | G06F 11/203 |
| 2017/0054802 A1 * | 2/2017 | Annamalai | H04L 67/1095 |
| 2017/0060705 A1 * | 3/2017 | Sridhara | G06F 11/1662 |

* cited by examiner

HANDLING A VIRTUAL DATA MOVER (VDM) FAILOVER SITUATION BY PERFORMING A NETWORK INTERFACE CONTROL OPERATION THAT CONTROLS AVAILABILITY OF NETWORK INTERFACES PROVIDED BY A VDM

BACKGROUND

A data storage system stores host data on behalf of one or more host computers. For example, some conventional data storage systems use virtual data movers or VDMs, i.e., software features that enable the grouping of Common Internet File System or (CIFS) and/or Network File System (NFS) environments and servers into virtual containers.

A conventional VDM-style data storage system may include two data storage arrays, i.e., a first array and a second array. Additionally, each array may operate multiple VDMs.

For VDMs on the first array, the copies (or versions) of the data that are handled by these VDMs may be replicated from the first array to the second array via synchronous replication sessions. For these sessions, the first array is considered the production (or active) side because it maintains production copies of the data, and the second array is considered the replica (or standby) side because it maintains replica copies of the data. Changes to the production copies of the data on the production side are forwarded to the standby side during the replication sessions.

Likewise, for VDMs on the second array, the copies of the data that are handled by these VDMs may be replicated from the second array to the first array via synchronous replication sessions. For these sessions, the second array is considered the production side, and the second array is considered the replica side. Again, changes to production copies of the data on the production side are forwarded to the standby side during the replication sessions.

SUMMARY

Unfortunately, there are deficiencies to the above-described conventional VDM-style data storage system that simply replicates changes from the production side to the replica side. For example, suppose that a disaster occurs on the first array (e.g., a VDM panic situation, a power failure, etc.) causing an original VDM on the first array to fail. In such a situation, a new VDM is created on the second array so that host computers that used to access a production copy of host data on the first array can now access the replica copy of the host data on the second array. In particular, the new VDM uses the same Internet Protocol (IP) addresses as the original VDM on the production array so that data service is continuous and the switchover is transparent to the host computers. In this situation, the original VDM cannot be rebooted to use the same IP addresses since that would create duplicate IP addresses between the first and second arrays potentially resulting in data unavailability or data loss.

In contrast to the above-described conventional VDM-style data storage system that simply replicates changes on a production copy of host data on a first array to a replica copy of the host data on a second array, improved techniques involve performing a network interface control operation that controls availability of network interfaces provided by a VDM. In particular, when a VDM boots (e.g., following a VDM failure, following power restoration, etc.), a configuration file for the VDM is accessed to determine whether the network interfaces provided by the VDM were used in synchronous replication. If the network interfaces provided by the VDM were not being used in synchronous replication, these network interfaces are enabled (e.g., placed in the "UP" state) for use. However, if the network interfaces provided by the VDM were being used in synchronous replication, these network interfaces are disabled (e.g., placed in the "DOWN" state) to prevent duplicate IP addresses that could otherwise cause data unavailability or even data loss. If the network interfaces are disabled, other criteria may then be evaluated to determine whether the network interfaces should be permanently disabled or then be enabled (e.g., if the VDM is on the active side).

One embodiment is directed to a method of handling a VDM failover situation. The method includes electronically adjusting a configuration file on a first physical data mover platform to indicate whether data managed by an initial VDM on the first physical data mover platform is being replicated from the first physical data mover platform to a second physical data mover platform. The method further includes, following a VDM failover event in which the initial VDM on the first physical data mover platform fails and a second VDM is created on the second physical data mover platform, electronically creating a replacement VDM on the first physical data mover platform to replace the initial VDM. The method further includes, after the replacement VDM is created, performing a network interface control operation that controls availability of network interfaces provided by the replacement VDM, the network interface control operation (i) enabling a set of network interfaces of the replacement VDM when the network interface control operation determines from the configuration file that the data managed by the initial VDM on the first physical data mover platform was not being replicated from the first physical data mover platform to the second physical data mover platform at the time of the VDM failover event, and (ii) disabling the set of network interfaces of the replacement VDM when the network interface control operation determines from the configuration file that the data managed by the initial VDM on the first physical data mover platform was being replicated from the first physical data mover platform to the second physical data mover platform at the time of the VDM failover event.

If the network interfaces of the replacement VDM are disabled, it should be understood that subsequent checks can be performed to determine whether other criteria justify enabling the network interfaces of the replacement VDM. For example, if a subsequent check determines that the replacement VDM is on the standby side (i.e., there has been VDM failover to the second physical data mover platform), the network interfaces can be disabled permanently. However, if a subsequent check determines that the replacement VDM is on the active side, the network interfaces can be enabled so that the replacement VDM can serve host computers.

In some arrangements, a first copy of the data resides on a first storage array that is coupled to the first physical data mover platform. In these arrangements, the initial VDM initially manages the first copy of the data as a production version. Additionally, the method further includes, prior to the failover event, enabling a set of network interfaces of the initial VDM to provide host computer access to the first copy of the data that resides on the first storage array.

In some arrangements, a second copy of the data resides on a second storage array that is coupled to the second physical data mover platform. The second copy of the data initially forms a secondary (or standby) version. In these arrangements, the method further includes, prior to the failover event, providing a replication service between the first physical data mover platform and the second physical data mover platform, the replication service replicating changes to the first copy of the data that resides on the first storage array to the second copy of the data that resides on the second storage array.

In some arrangements, the first copy of the data includes a production logical unit of storage (LUN). The second copy of the data includes a secondary LUN. Additionally, providing the replication service includes creating a synchronous replication session that synchronously replicates information from the production LUN to the secondary LUN.

In some arrangements, the VDM failover event includes encountering a failure of the initial VDM. In these arrangements, creating the replacement VDM on the first physical data mover platform includes, in response to encountering the failure of the initial VDM, booting the replacement VDM on the first physical data mover platform to replace the initial VDM.

In some arrangements, encountering the failure of the initial VDM includes losing power to the first physical data mover platform. In these arrangements, booting the replacement VDM includes, in response to restoration of power to the first physical data mover platform, automatically instantiating the replacement VDM on the first physical data mover platform.

In some arrangements, the VDM failover event causes creation of a secondary VDM on the second physical data mover platform, the secondary VDM managing host computer access to the second copy of the data that resides on the second storage array. In these arrangements, performing the network interface control operation includes accessing configuration data from the configuration file and, based on the configuration data, disabling the set of network interfaces of the replacement VDM to prevent a conflict with a set of network interfaces of the secondary VDM.

In some arrangements, accessing the configuration data from the configuration file includes reading a set of flags from the configuration file. The set of flags indicate that the set of network interfaces of the replacement VDM should not be enabled, the set of flags having been set in response to creation of a replication session that replicates changes to the first copy of the data that resides on the first storage array to the second copy of the data that resides on the second storage array.

In some arrangements, disabling the set of network interfaces of the replacement VDM includes creating the set of network interfaces of the replacement VDM, and placing each network interface of the set of network interfaces of the replacement VDM in a "DOWN" state that disables that network interface of the set of network interfaces of the replacement VDM, while each network interface of the set of network interfaces of the secondary VDM in an "UP" state that enables that network interface of the set of network interfaces of the secondary VDM.

In some arrangements, each network interface is defined by a respective Internet Protocol (IP) address through which an external host computer accesses at least a portion of the data over a computerized network.

In some arrangements, the method further includes, after performing the network interface control operation that controls the availability of the network interfaces provided by the replacement VDM, (i) performing a check operation that determines whether the replacement VDM is on a standby side or an active side, (ii) permanently setting the set of network interfaces of the replacement VDM to a disabled state when the check operation indicates that the replacement VDM is on the standby side, and (iii) setting the network interfaces of the replacement VDM to an enabled state when the check operation indicates that the replacement VDM is on the active side. If the set of network interfaces is set to the enabled state, the replacement VDM is then able to serve the data to host computers.

Another embodiment is directed to data storage equipment which includes memory, and control circuitry coupled to the memory. The memory stores instructions which, when carried out by the control circuitry, cause the control circuitry to:
(A) electronically adjust a configuration file on a first physical data mover platform to indicate whether data managed by an initial VDM on the first physical data mover platform is being replicated from the first physical data mover platform to a second physical data mover platform,
(B) following a VDM failover event in which the initial VDM on the first physical data mover platform fails, electronically create a replacement VDM on the first physical data mover platform to replace the initial VDM, and
(C) after the replacement VDM is created, perform a network interface control operation that controls availability of network interfaces provided by the replacement VDM, the network interface control operation (i) enabling a set of network interfaces of the replacement VDM when the network interface control operation determines from the configuration file that the data managed by the initial VDM on the first physical data mover platform was not being replicated from the first physical data mover platform to the second physical data mover platform at the time of the VDM failover event, and (ii) disabling the set of network interfaces of the replacement VDM when the network interface control operation determines from the configuration file that the data managed by the initial VDM on the first physical data mover platform was being replicated from the first physical data mover platform to the second physical data mover platform at the time of the VDM failover event.

Yet another embodiment is directed to a computer program product having a non-transitory computer readable medium which stores a set of instructions to handle a VDM failover situation. The set of instructions, when carried out by computerized circuitry, causes the computerized circuitry to perform a method of:
(A) electronically adjusting a configuration file on a first physical data mover platform to indicate whether data managed by an initial VDM on the first physical data mover platform is being replicated from the first physical data mover platform to a second physical data mover platform;
(B) following a VDM failover event in which the initial VDM on the first physical data mover platform fails, electronically creating a replacement VDM on the first physical data mover platform to replace the initial VDM; and
(C) after the replacement VDM is created, performing a network interface control operation that controls availability of network interfaces provided by the replacement VDM, the network interface control operation (i) enabling a set of network interfaces of the replacement VDM when the network interface control operation determines from the configuration file that the data managed by the initial VDM on the first physical data mover platform was not being replicated from the first physical data mover platform to the second physical data mover platform at the time of the VDM failover event, and (ii) disabling the set of network interfaces of the replacement VDM when the network interface control operation determines from the configuration file that the data managed by the initial VDM on the first physical data mover platform was being replicated from the first physical data mover platform to the second physical data mover platform at the time of the VDM failover event.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in handling a VDM failover situation by performing a network interface control operation that controls availability of network interfaces provided by a VDM.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing an operation that controls availability of a network interface provided by a virtual data mover (VDM). In particular, when a VDM boots (e.g., following a VDM failure, following power restoration, etc.), a configuration file for the VDM is accessed to determine whether the network interface provided by the VDM was used in replication. If the network interface provided by the VDM was not being used in replication, the network interface is enabled (e.g., placed in the "UP" state) for use. However, if the network interface provided by the VDM was being used in replication, the network interface is disabled (e.g., placed in the "DOWN" state) to prevent duplicate IP addresses that could otherwise cause data unavailability or even data loss.

If the network interfaces of the VDM are disabled, subsequent checks can be performed to determine whether other criteria justify enabling the network interfaces. Along these lines, if a subsequent check determines that the VDM is on the standby side (i.e., there has been VDM failover and another VDM is now serving the data), the network interfaces can be disabled permanently. However, if a subsequent check determines that the VDM is on the active side, the network interfaces can be enabled so that the VDM can serve the data to host computers.

Figure 1:
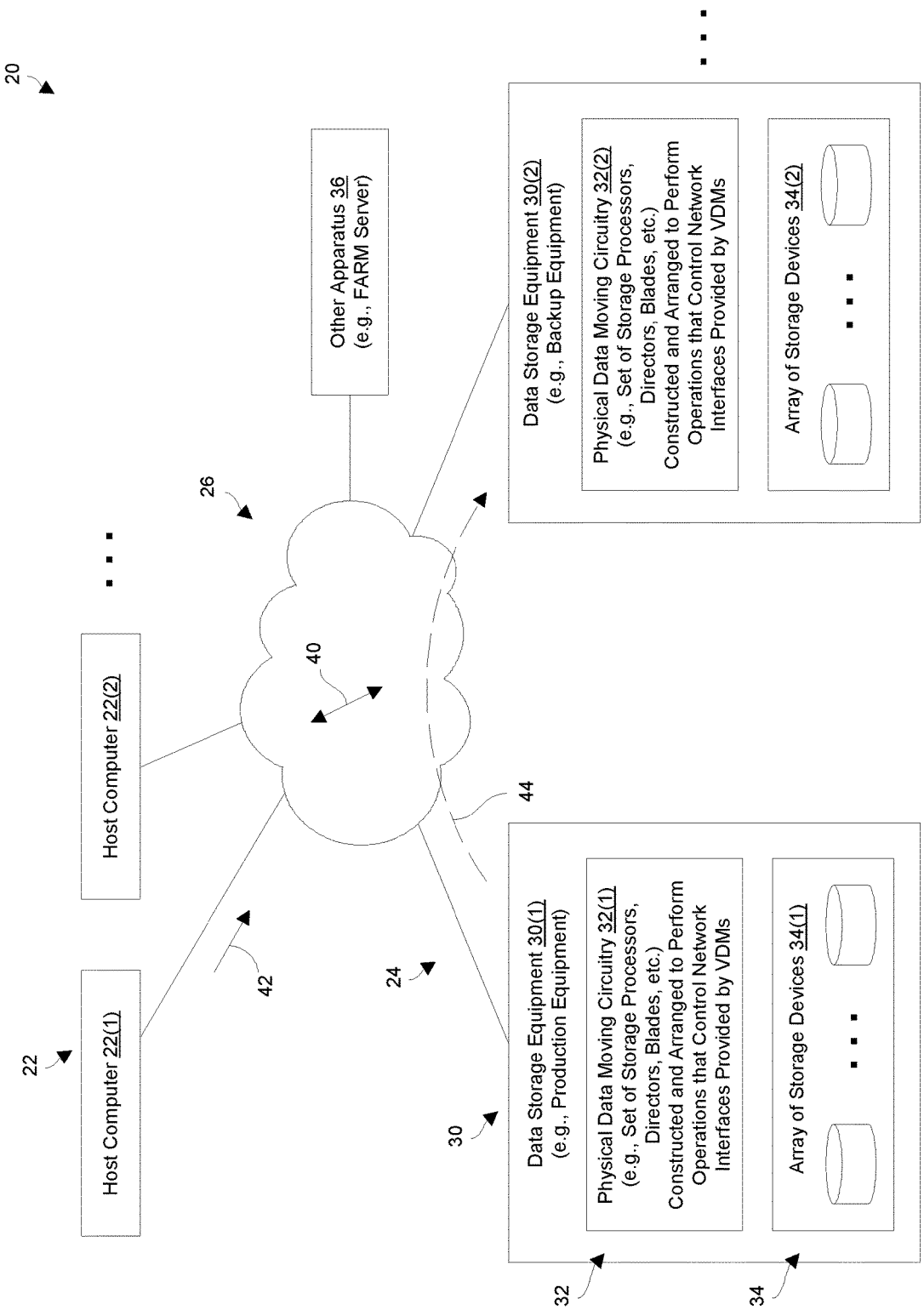
FIG. 1 is a block diagram of a data storage environment which is suitable for handling a VDM failover by performing an operation that controls network interfaces provided by the VDM.

FIG. 1 shows a data storage environment 20 which is suitable for handling a VDM failover by performing an operation that controls network interfaces provided by the VDM. The data storage environment 20 includes host computers 22(1), 22(2), . . . (collectively, host computers 22), a data storage system 24, and a communications medium 26.

Each host computer 22 is constructed and arranged to access host data that is maintained by the data storage system 24. Along these lines, the host computers 22 may operate as independent devices, as one or more clusters, or combinations thereof to perform useful work (e.g., to access databases, as webservers, as content servers, as email servers, combinations thereof, etc.).

The data storage system 24 is constructed and arranged to store host data on behalf of the host computers 22. The host data may reside in files of file systems, as block-based data within logical units of storage (LUNs) or volumes, volumes within files, file systems within volumes, combinations thereof, and so on. The particular storage techniques that are put in use (e.g., file-based, block-based, etc.) may be application dependent and can be configured by the operator of the data storage system 24.

The data storage system 24 includes data storage equipment 30(1), data storage equipment 30(2), . . . (collectively, data storage equipment 30). Such data storage equipment 30 may reside locally (e.g., within the same room, on the same floor, within the same facility, etc.) or remote from each other (e.g., in different buildings, across a campus, etc.).

The data storage equipment 30(1) includes physical data moving circuitry 32(1) and an array of storage devices 34(1). The physical data moving circuitry 32(1) is constructed and arranged to write data into the array of storage devices 34(1), and read data from the array of storage devices 34(1).

Similarly, the data storage equipment 30(2) includes physical data moving circuitry 32(2) and an array of storage devices 34(2). Additionally, the physical data moving circuitry 32(2) is constructed and arranged to write data into the array of storage devices 34(2), and read data from the array of storage devices 34(2).

In connection with each data storage equipment 30, various forms of fault tolerance and redundancy may be provided. Examples include use of redundant storage processors/blades/directors/etc., redundant power feeds, redundant power supplies, backup power, redundant network feeds, data mirroring, use of parity and checksums for error detection and correction, RAID groups configured to withstand storage device failures, hot standby storage devices, combinations thereof, and so on.

In some arrangements, the data storage system 24 may include other apparatus 36 as well. An example of such apparatus 36 is a file auto recovery manager (FARM) server which monitors and manages certain data storage system services such as replication among the data storage equipment 30, VDM mobility, data recovery between arrays 34, and so on.

The communications medium (or fabric) 26 is constructed and arranged to connect the various components of the data storage environment 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

During operation, the host computers 22 send host I/O requests 42 (e.g., file access commands, SCSI commands, etc.) to the data storage system 24 through the communications medium 26. Such host I/O requests 42 write data to the data storage system 24 and read data from the data storage system 24.

For example, suppose that a VDM running on the physical data moving circuitry 32(1) of the data storage equipment 30(1) is configured to handle host I/O requests 42 for particular LUNs residing in the array 34(1). To this end, the VDM turns its network interfaces to the "UP" state to enable the network interfaces. Accordingly, the host computers 22 are able to communicate with the VDM and robustly and reliably store host data into and load host data from the data storage equipment 30(1).

Further suppose that the data storage system 24 provides a replication service which is transparent to the host computers 22 to replicate the data handled by the VDM. To this end, the data storage equipment 30(1) establishes a replication session 44 with the data storage equipment 30(2) that synchronously replicates all changes to the data from the array 34(1) of the data storage equipment 30(1) to the array 34(2) of the data storage equipment 30(2). For this VDM situation, the data storage equipment 30(1) is considered the active (or production) side, and the data storage equipment 30(2) is considered the standby (or replica) side.

It should be further understood that if there is a disaster at the data storage equipment 30(1), a second VDM can be created on the physical data moving circuitry 32(2) of the data storage equipment 30(2) and configured to handle the host I/O requests 42 but via the replicated data residing on the array 34(2). As a result, the host computers 22 now communicate with the data storage equipment 30(2) as the active side. Such operation may be coordinated by a FARM server (also see the other apparatus 36 in FIG. 1). To this end, the second VDM turns its network interfaces to the "UP" state (i.e., putting particular IP addresses into use). As a result, the host computers 22 are able to communicate with the second VDM and robustly and reliably store host data into and load host data from the data storage equipment 30(2). This process of VDM failover may take place in a transparent manner that does not diminish high availability of host data from the perspective of the host computers 22.

At this point, it should be understood that the cause of the disaster at the data storage equipment 30(1) could be minor in nature. For example, the VDM running on the data storage equipment 30(1) could have panicked, the data storage equipment 30(1) could have lost power temporarily, and so on. Here, if a new VDM is created on the data storage equipment 30(1), the new VDM should not turn its network interfaces to the "UP" state. Rather, such a conflicting situation would put duplicate IP addresses into use (i.e., the same IP addresses would be used by the second VDM at the data storage equipment 30(1) and the new VDM at the data storage equipment 30(2)) and, thus, potentially cause data unavailability or even data loss.

To prevent use of duplicate IP addresses, when a new VDM is created on the data storage equipment 30(1) to replace the initial VDM on the data storage equipment 30(1), the network interfaces of the new VDM are turned to the "DOWN" state thus disabling the network interfaces. Accordingly, only the second VDM on the data storage equipment 30(2) uses the IP addresses. As a result, there is no IP address conflict between the new VDM the data storage equipment 30(1) and the second VDM on the data storage equipment 30(2).

It should be understood that the data storage system 24 may continue to operate with the data storage equipment 30(2) as the active side for an extended period of time or even indefinitely. In fact, a new replication session may be created in which data is now replicated in the reverse direction (from the data storage equipment 30(2) to the data storage equipment 30(1)), i.e., in a direction opposite the arrow 44 in FIG. 1. In this situation, the data storage equipment 30(2) may be viewed as the active or production side, and the data storage equipment 30(1) may be viewed as the standby or replica side.

However, at some point, the operator of the data storage system 24 may decide to return the data storage equipment 30 back to the original VDM configuration. Here, the operator can perform a careful and methodic procedure of synchronizing the data between the data storage equipment 30(1), 30(2), deleting the VDM on the data storage equipment 30(1) and running a cleaning procedure, and failing over the VDM on the data storage equipment 30(2) to the data storage equipment 30(1). For the VDM, such operation makes the data storage equipment 30(1) the active side and the data storage equipment 30(2) the standby side. In some arrangements, some of all of this process may be controlled by a FARM server (also see the apparatus 36 in FIG. 1).

As will be explained in further detail shortly, control of whether a VDM turns its network interfaces to the "UP" state for use, or "DOWN" state to avoid possible duplicate IP address situations, can be based on the contents of the configuration file that contains particular VDM operating parameters as well as other checking. Along these lines, within the configuration file, there is a flag per each network interface. The flag is initially cleared, but later set if a synchronous replication session is started to replicate data that is accessible via that network interface. Accordingly, when a VDM boots, the flags within the configuration file for that VDM are checked and if the flags are cleared, the VDM turns its network interfaces to the "UP" state for use. However, if the flags are set, the VDM turns its network interfaces to the "DOWN" state for non-use. Such placement of the network interfaces in the "DOWN" state may be temporary (i.e., a deferred "DOWN" state), or made permanent based on other criteria. Further details will now be provided with reference to FIG. 2.

Figure 2:
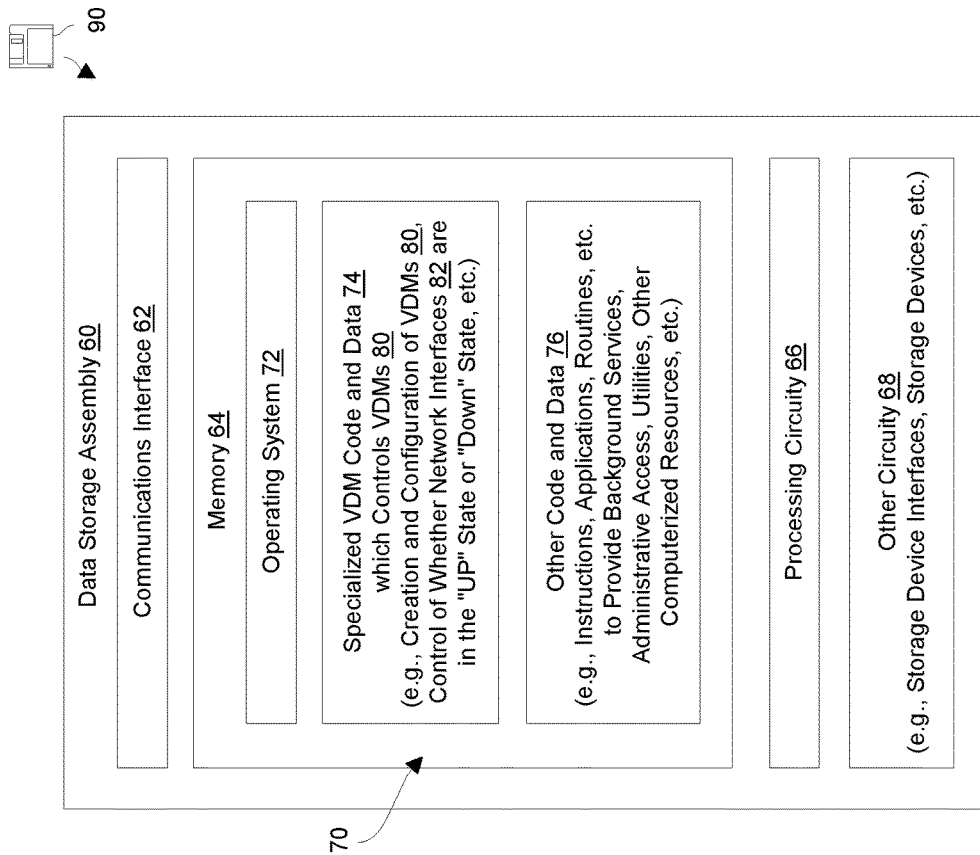
FIG. 2 is a block diagram of an electronic apparatus of the data storage environment of FIG. 1.

FIG. 2 shows a data storage assembly 60 which is suitable for forming all or part of the data storage equipment 30(1), or the data storage equipment 30(2), and so on (also see FIG. 1). The data storage assembly 60 includes a communications interface 62, memory 64, processing circuitry 66, and other circuitry 68.

The communications interface 62 is constructed and arranged to connect the data storage assembly 60 to the communications medium 26 (also see FIG. 1) to enable communications with other devices of the data storage environment 20 (e.g., the host computers 22, other data storage equipment 30, other apparatus 36, etc.). Such communications may be IP-based, SAN-based, cellular-based, cable-based, fiber-optic based, wireless, cloud-based, combinations thereof, and so on. Accordingly, the communications interface 62 enables the data storage assembly 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized VDM code and data 74, and other code and data 76. The operating system 72 is intended to refer control instructions such as a kernel to manage computerized resources (e.g., processor cycles, memory space, etc.), drivers (e.g., an I/O stack), and so on. The specialized VDM code and data 74 includes instructions and data that, when run on and handled by the processing circuitry 66, causes the processing circuitry 66 to create a VDM 80 with its network interfaces 82 smartly turned either in the "UP" state for use, or the "DOWN" state to avoid creating a duplicate IP address situation. The other code and data 76 includes instructions, applications, routines, etc. to provide other features such as background services (e.g., replication services, snapshots, deduplication, etc.), user-level applications, administrative tools, utilities, other computerized resources, and so on.

The processing circuitry 66 is constructed and arranged to operate in accordance with the various software constructs 70 stored in the memory 64. As will be explained in further detail shortly, the processing circuitry 66 executes the specialized code and data 74 to form specialized circuitry that controls VDMs 80. In particular, such specialized circuitry instantiates the VDMs 80, configures the VDMs 80, operates the VDMs 80, and so on. Once a VDM 80 is created, the VDM 80 handles host I/O requests 42 (e.g., read and write commands) from the host computers 22.

Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the data storage assembly 60. In particular, the computer program product 90 has a non-transitory (or non-volatile) computer readable medium which stores a set of instructions which controls one or more operations of the data storage assembly 60. Examples of suitable computer readable storage media include tangible articles of manufacture and apparatus which store instructions in a non-volatile manner such as CD-ROM, DVD, flash memory, disk memory, tape memory, and the like.

The other circuitry 68 represents other specialized hardware of the data storage assembly 60. Such specialized hardware may include storage device interfaces (e.g., for SATA, SAS, PCIe, etc.), storage devices themselves (e.g., flash drives, magnetic disk drivers, etc.), and so on. Further details will now be provided with reference to FIGS. 3 through 5, and an explanation of a particular arrangement that involves using flags within VDM configuration files.

Figure 3:
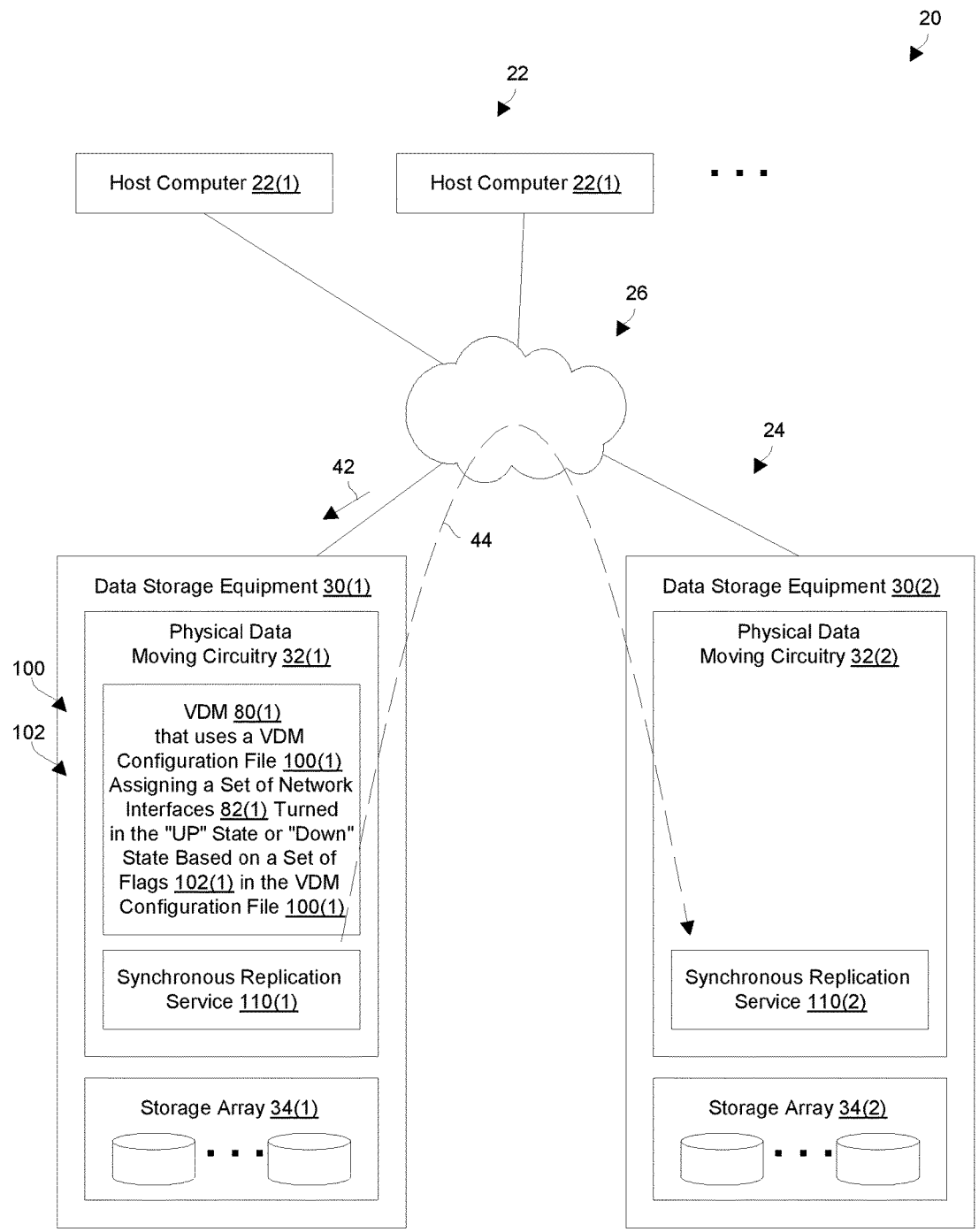
FIG. 3 is a block diagram of particular portions of the data storage environment at a first time.
Figure 4:
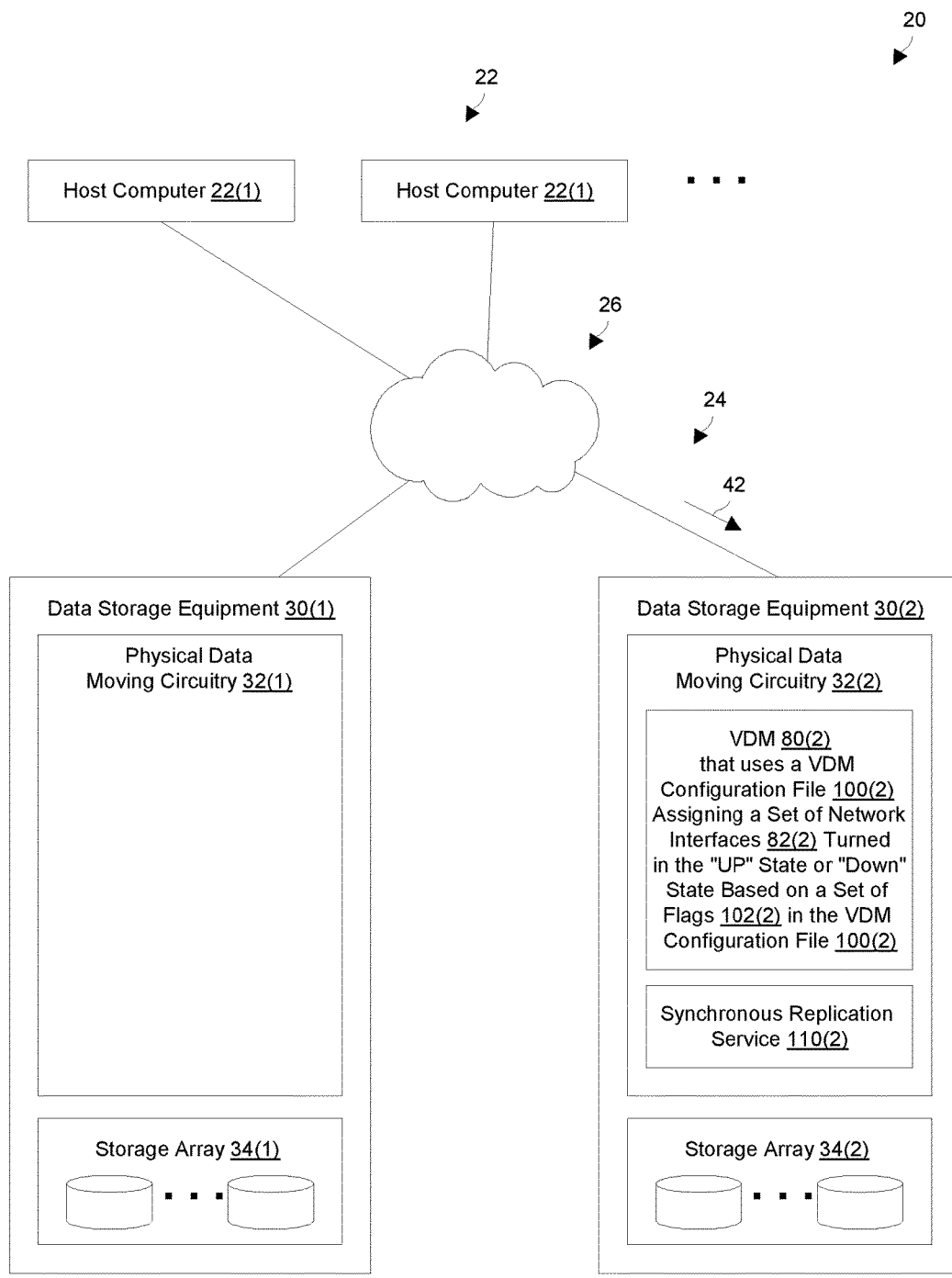
FIG. 4 is a block diagram of the particular portions of the data storage environment at a second time.
Figure 5:
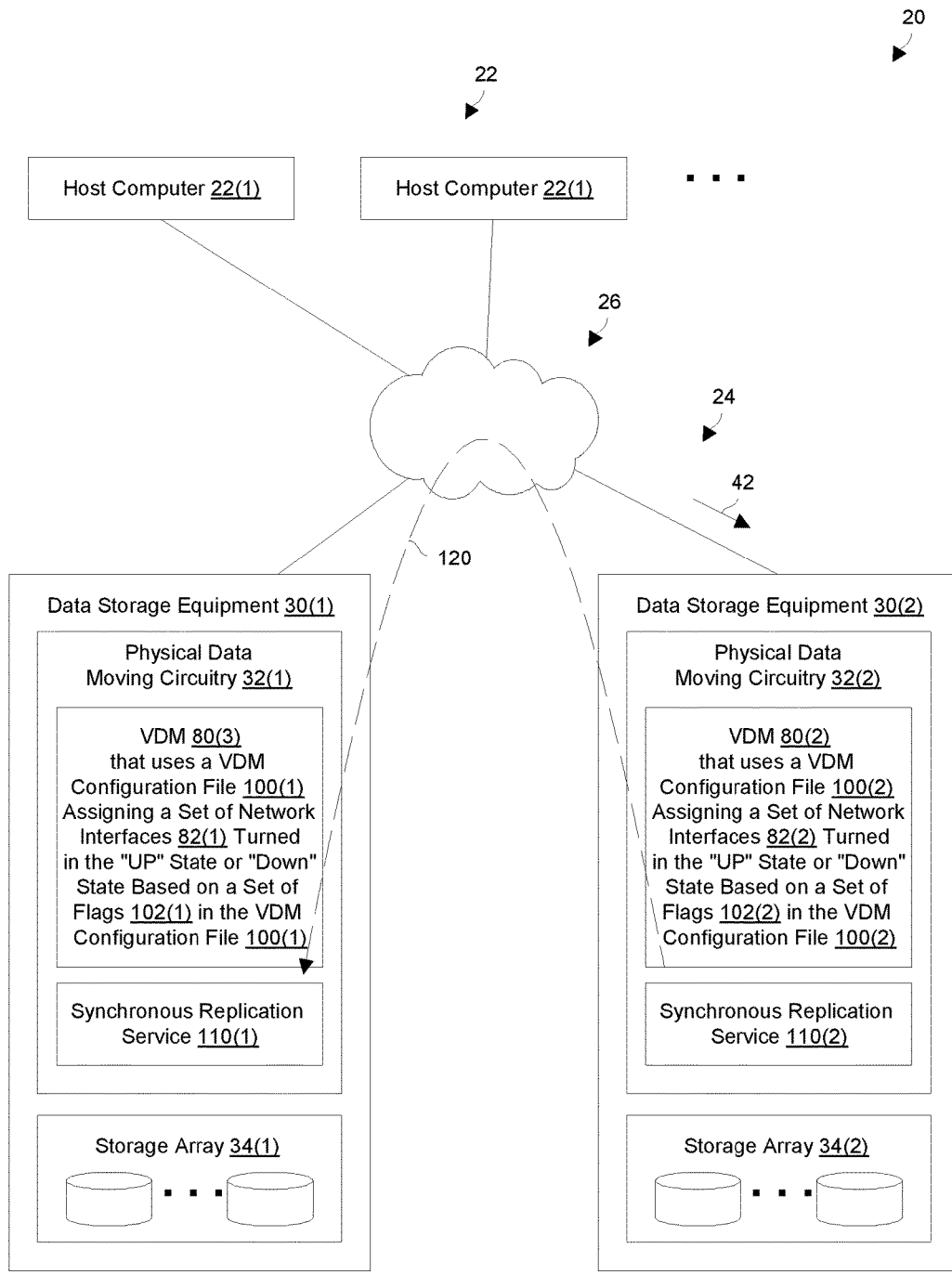
FIG. 5 is a block diagram of the particular portions of the data storage environment at a third time.

FIGS. 3 through 5 show particular portions of the data storage environment 20 in which the host computers 22 provide host I/O requests 42 to access host data that is managed by the data storage system 24 (also see FIG. 1). In particular, there is a VDM switchover event and avoidance of a duplicate IP address situation via a network interface control operation. FIG. 3 shows the particular portions at a first time T1. FIG. 4 shows the particular portions at a second time T2 that is after the first time T1. FIG. 5 shows the particular portions at a third time T3 that is after the second time T2.

Before further VDM switchover details are provided, it should be understood that the data storage system 24 maintains configuration files 100 which are accessed when creating VDMs 80. In particular, when booting a VDM 80, there is an associated configuration file 100 that is accessed in order to obtain various operating parameters such as information for the VDM's network interfaces 82, i.e., IP addresses and paths that are used by (or deemed to "belong to") the VDM 80. Advantageously, in accordance with certain arrangements, the data storage system 24 uses specialized configuration files 100 that include flags 102 indicating whether the data that is being handled by the VDMs 80 is currently being replicated. Prior to turning the network interfaces 82 to the "UP" state, a network interface control operation is performed on these flags 102 to determine whether the data was being replicated. In the absence of replication of the data that is handled by the VDM 80, the configuration file flags 102 are cleared or un-asserted (e.g., set to "0") and the VDM 80 can safely place the network interfaces 82 in the "UP" state for use. However, if there was replication of the data that is handled by the VDM 80, the configuration file flags 102 are set or asserted (e.g., set to "1") and the VDM 80 places the network interfaces 82 in the "DOWN" state, at least temporarily, to prevent duplicate IP addresses, i.e., VDM switchover may have occurred and the same IP addresses may be in use by another VDM 80. Such avoidance of duplicate IP addresses prevents unintended data unavailability and even data loss.

It should be understood that the following description in connection with FIGS. 3 through 5 discusses operation of the data storage equipment 30(1), 30(2) with respect to just one VDM 80 for simplicity. However, the data storage equipment 30(1) may have many VDMs 80 running on it and, similarly, the data storage equipment 30(2) may have many VDMs 80 running on it at any particular time.

At time T1 and as shown in FIG. 3, a VDM 80(1) is operating on the physical data moving circuitry 32(1) of the data storage equipment 30(1). Accordingly, the network interfaces 82(1) of the VDM 80(1) are placed in the "UP" state thus enabling the network interfaces 82(1), i.e., the VDM 80(1) presents the network interfaces 82(1) (e.g., IP addresses) to the host computers 22 to facilitate data access. As a result, the host I/O requests 42 are processed using the VDM 80(1) and the storage array 34(1).

During this time T1, suppose that the operator of the data storage system 24 wishes to further safeguard that data by replicating the data to the data storage equipment 30(2). To this end, the operator directs the data storage system 24 to establish a replication session 44 via synchronous replication services 110(1), 110(2). To this end, the operator may enter a command to a graphical user interface that effectuates this operation (e.g., also see the FARM server in FIG. 1, and code for tools/utilities in FIG. 2).

When the replication session 44 is established, the configuration file 100(1) that is used by the VDM 80(1) is updated to indicate that any new VDM 80 that later boots using that configuration file 100(1) should not place or at least defer placing the network interfaces 82 in the "UP" state for use. In particular, the flags 102(1) are set to identify that any new VDM 80 that uses the configuration file 100(1) should place its network interfaces 82 in the "DOWN" state at least temporarily. Here, the data storage equipment 30(1) is considered to be the active (or production) side, and the data storage equipment 30(2) is considered to be the standby (or replica) side since it is updated by the replication session 44. For synchronous replication, each host write operation is considered complete only after the data is properly written to both the data storage equipment 30(1) and the data storage equipment 30(2).

Next, at time T2 (after time T1) and as shown in FIG. 4, the VDM 80(1) fails and a second VDM 80(2) is created on the physical data moving circuitry 32(2) of the data storage equipment 30(2) to transparently take over serving the data to the host computers 22. Accordingly, the network interfaces 82(2) of the VDM 80(2) are placed in the "UP" state, i.e., the VDM 80(2) presents the network interfaces 82(2) (e.g., IP addresses) to the host computers 22 to facilitate data access. As a result, the data storage equipment 30(2) is now the active side, and the host I/O requests 42 are now processed using the VDM 80(2) and the data storage equipment 30(2). Preferably, this VDM switchover is transparent to the host computers 22 and high data availability is maintained by the data storage system 24.

It should be understood that the VDM 80(2) placed its network interfaces 80(2) in the "UP" state because the flags 102(2) in the configuration file 100(2) for the VDM 80(2) were not set, i.e., the flags 102(2) were cleared. Additionally, the network interfaces 80(2) of the VDM 80(2) use the same network parameters (e.g., IP addresses) as the network interfaces 80(1) of the VDM 80(2) so that VDM switchover is as transparent as possible to the host computers 22.

It should be further understood that the VDM switchover may have been initiated in response to a disaster at the data storage equipment 30(1). Along these lines, the VDM 80(1) may have panicked (e.g., due to a software bug or configuration issue), may have gone down due to power loss, may have been inadvertently reset, etc. In such situations, the data storage equipment 30(1) may create a new VDM 80 to replace the initial VDM 80(1) (FIG. 3).

At time T3 (after time T2) and as shown in FIG. 5, a new VDM 80(3) is created on the physical data moving circuitry 80(1) of the data storage equipment 30(1). Such VDM creation may have occurred automatically in response to power restoration, reset, etc. Furthermore, such VDM creation may have been desirable if there had been no replication and VDM switchover. However, since there was replication and VDM switchover, the new VDM 80(3) does not place its assigned network interfaces 80(1) in the "UP" state. Rather, the configuration file 100(1) that is used by the VDM 80(3) (which is essentially a rebooting of the VDM 80(1)) includes flags 102(1) which were set in response to creation of the replication session 44 (also see FIG. 3). Accordingly, the new VDM 80(3) places its assigned network interfaces 80(1) in the "DOWN" state to disable the network interfaces thus avoiding duplicate IP addresses.

During time T3, a replication session 120 may be created that performs reverse replication, i.e., replication of the data on the storage array 34(2) to the storage array 34(1). In this situation, the data storage equipment 30(2) is now considered the active side, and the data on the storage array 34(1) is considered the standby side.

It should be understood that there is redundancy and fault tolerance in the situation shown in FIG. 5. In particular, if the data storage equipment 30(2) were to fail, there is a complete copy of the data on the data storage equipment 30(1). Moreover, it is possible to configure the data storage equipment 30(1) to handle a subsequent VDM switchover from the data storage equipment 30(2) to the data storage equipment 30(1). Accordingly, it is possible to keep the situation of FIG. 5 going for an extended period of time or even indefinitely.

Nevertheless, additional administrative operations may be performed on the situation of FIG. 5 (e.g., VDM cleaning, etc.) to restore the data storage system 24 back to the situation of FIG. 3. During such operations, the VDM switchover is preferably transparent to the host computers 22 with minimal down time if any.

It should be further understood that, if a determination had been made that the data storage equipment 30(1) was the still active side for the VDM 100(3) (i.e., there was no VDM 100(2) running on the data storage equipment 30(2)), the network interfaces 82(1) can be turned to the "UP" state to enable the VDM 100(3) to serve the host computers 22. Here, there is no possibility of duplicate IP addresses since there is no VDM 100(2) running on the data storage equipment 30(2). Accordingly, the network interfaces 82(1) were only temporarily turned to the "DOWN" state (i.e., a deferred "DOWN" state) in response to the configuration file flags 102(1) before later being turned to the "UP" state. Further details will now be provided with reference to FIG. 6.

Figure 6:
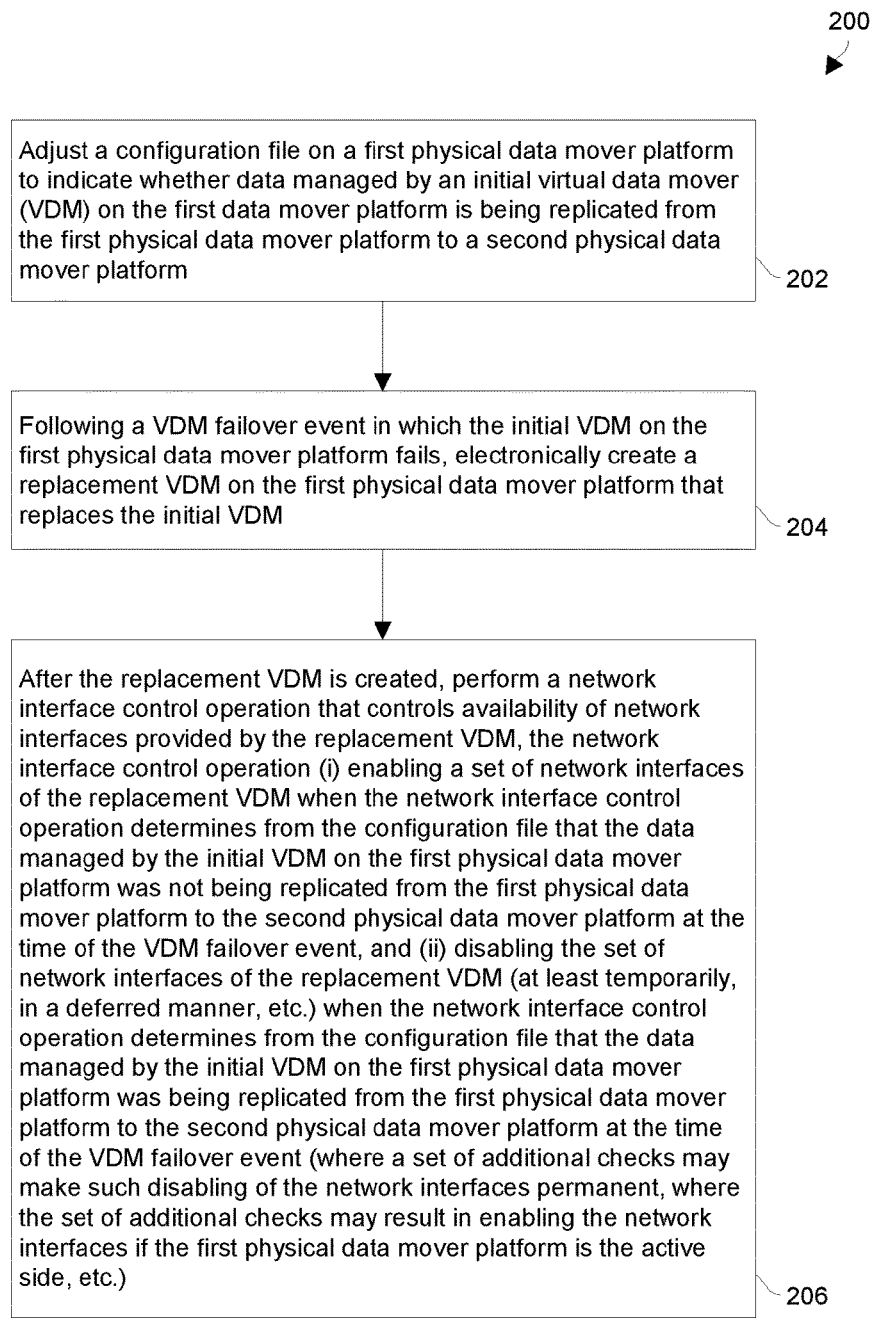
FIG. 6 is a flowchart of a procedure which is performed by the electronic apparatus of FIG. 2.

FIG. 6 is a flowchart of a procedure 200 which is performed by circuitry of the data storage system 24 when handling a VDM failover situation. At 202, the circuitry electronically adjusts a configuration file on a first physical data mover platform to indicate whether data managed by an initial VDM on the first physical data mover platform is being replicated from the first physical data mover platform to a second physical data mover platform (also see FIG. 4).

At 204, following a VDM failover event in which the initial VDM on the first physical data mover platform fails, the circuitry electronically creates a replacement VDM on the first physical data mover platform to replace the initial VDM. Here, another VDM may have been created on the second physical data mover platform to serve the data handled by the initial VDM. Recall, that in connection with FIG. 5, a replacement VDM may be created automatically after power restoration, after a reset, etc.

At 206, after the replacement VDM is created, the circuitry performs a network interface control operation that controls availability of network interfaces provided by the replacement VDM. The network interface control operation (i) enables a set of network interfaces of the replacement VDM when the network interface control operation determines from the configuration file that the data managed by the initial VDM on the first physical data mover platform was not being replicated from the first physical data mover platform to the second physical data mover platform at the time of the VDM failover event, and (ii) disables the set of network interfaces of the replacement VDM when the network interface control operation determines from the configuration file that the data managed by the initial VDM on the first physical data mover platform was being replicated from the first physical data mover platform to the second physical data mover platform at the time of the VDM failover event.

Such disabling of the network interfaces may be temporary or made permanent based on other criteria. Along these lines, if it is determined that the first physical data mover platform is the active side for the replacement VDM, the network interfaces may then be enabled so that the replacement VDM is able to serve host computers.

As described above, improved techniques involve performing a network interface control operation that controls availability of network interfaces 82 provided by a VDM 80. In particular, when a VDM 80 boots (e.g., following a VDM failure, following power restoration, etc.), a configuration file 100 for the VDM 80 is accessed to determine whether the network interfaces 82 provided by the VDM 80 were used in synchronous replication. If the network interfaces 82 provided by the VDM 80 were not being used in synchronous replication, these network interfaces 82 are enabled (e.g., placed in the "UP" state) for use. However, if the network interfaces 82 provided by the VDM 80 were being used in synchronous replication, these network interfaces 82 are disabled at least temporarily (e.g., placed in the "DOWN" state) to prevent duplicate IP addresses that could otherwise cause data unavailability or even data loss.

One should appreciate that the above-described techniques do not merely control operation of VDMs 80. Rather, the disclosed techniques involve a particular manner of improving technology by preventing the use of duplicate IP addresses following a VDM switchover event. With these techniques, other advantages are available as well such as avoidance of unnecessary data unavailability, prevention of data loss, VDM control which is transparent to the host computers 22, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as a FARM server are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

In some arrangements, the data storage system 24 includes two arrays called Array A and Array B. Moreover, it is possible to create many VDMs 80 on Array A and Array B.

For VDMs 80 on Array A, synchronous replication sessions 44 may be created which send data changes from Array A to Array B. For these replication sessions 44, Array A is the active (or production) side and Array B is the standby (or replica) side.

It should be understood that synchronous replication sessions 44 can be created for VDMs 80 on the Array B which send data changes to the Array A. From this perspective, Array B is the active side and Array A is the standby side.

If there is a VDM is failover from Array A to Array B while synchronous replication is being performed, Array B becomes the new active side and Array A becomes the new standby side.

In at least some arrangements, the failover command to failover a VDM from one platform to another is always initiated from the standby side. For example, if the standby side is Array B then, during failover, another VDM is created on Array B to take over service from the initial VDM on Array A.

In at least some arrangements, during failover, Array B will try to disable interfaces and other resources (e.g., un-export the CIFS/NFS shares, un-mount the file-systems and checkpoints, etc) by sending a set of commands to Array A. However, it should be understood that there is no guarantee that the set of commands will be executed because Array A may have encountered one or more failures. But, if Array A is functioning during failover, the attempt to disable operation may succeed.

In at least some arrangements, although a VDM is created on Array B after failover, the replacement VDM on Array A is not deleted. Rather, the process makes sure that the network interfaces of the replacement VDM on Array A are disabled to avoid duplicate IP addresses.

In more detail, if the Array A is powered off or the physical data mover is rebooting during failover, the attempt to turn down network interfaces by the Array B will fail. In this situation, the set of configuration file flags are there to prevent any replacement VDM on the Array A from using duplicate IP addresses. Along these lines, when the Array A recovers from power outage or when the physical data mover of the Array A recovers from rebooting, the physical data mover checks the configuration file and performs the following actions:
  (i) if the set of configuration file flags is NOT set, the physical data mover enables the network interfaces of the VDM, but
  (ii) if set of configuration file flags is set, the physical data mover disables the network interfaces of the VDM (i.e., maintains the network interfaces in the "DOWN" state).

At this point, it is possible for more checking to occur. For example, the Array A may ask a control station (see the FARM server in FIG. 1) for guidance. Along these lines:
  (i) if Array A is the standby side for the VDM (i.e., if the session is failed over to Array B), then the network interfaces may be disabled permanently (e.g., the control station leaves the network interfaces in the "DOWN" state), or
  (ii) if Array A is the active side for the VDM, then the network interfaces may be enabled so that the replacement VDM can continue to serve host computers.

Accordingly, only network interfaces on the active side are permitted to be enabled.

Additionally, it should be understood that the replacement VDM on Array A can be completely deleted, (e.g., in response to a VDM cleanup command). Along these lines, the operator of the data storage system 24 may decide to failover the VDM from the Array B back to the Array A after cleanup operation. Such operation may be part of the lifecycle of session failover and failback. Such modifications and enhancements are intended to belong to various embodiments of the disclosure.

What is claimed is:

1. A method of handling a virtual data mover (VDM) failover situation, the method comprising:
electronically adjusting a configuration file on a first physical data mover platform to indicate whether data managed by an initial VDM on the first physical data mover platform is being replicated from the first physical data mover platform to a second physical data mover platform;
following a VDM failover event in which the initial VDM on the first physical data mover platform fails, electronically creating a replacement VDM on the first physical data mover platform that replaces the initial VDM; and
after the replacement VDM is created, performing a network interface control operation that controls availability of network interfaces provided by the replacement VDM, the network interface control operation (i) enabling a set of network interfaces of the replacement VDM when the network interface control operation determines from the configuration file that the data managed by the initial VDM on the first physical data mover platform was not being replicated from the first physical data mover platform to the second physical data mover platform at the time of the VDM failover event, and (ii) disabling the set of network interfaces of the replacement VDM when the network interface control operation determines from the configuration file that the data managed by the initial VDM on the first physical data mover platform was being replicated from the first physical data mover platform to the second physical data mover platform at the time of the VDM failover event.

2. A method as in claim 1 wherein a first copy of the data resides on a first storage array that is coupled to the first physical data mover platform; wherein the initial VDM initially manages the first copy of the data as a production version; and wherein the method further comprises:
prior to the failover event, enabling a set of network interfaces of the initial VDM to provide host computer access to the first copy of the data that resides on the first storage array.

3. A method as in claim 2 wherein a second copy of the data resides on a second storage array that is coupled to the second physical data mover platform, the second copy of the data initially forming a secondary version; and wherein the method further comprises:
prior to the failover event, providing a replication service between the first physical data mover platform and the second physical data mover platform, the replication service replicating changes to the first copy of the data that resides on the first storage array to the second copy of the data that resides on the second storage array.

4. A method as in claim 3 wherein the first copy of the data includes a production logical unit of storage (LUN); wherein the second copy of the data includes a secondary LUN; and wherein providing the replication service includes:
creating a synchronous replication session that synchronously replicates information from the production LUN to the secondary LUN.

5. A method as in claim 4 wherein the VDM failover event includes encountering a failure of the initial VDM; and wherein creating the replacement VDM on the first physical data mover platform includes:
in response to encountering the failure of the initial VDM, booting the replacement VDM on the first physical data mover platform to replace the initial VDM.

6. A method as in claim 5 wherein encountering the failure of the initial VDM includes losing power to the first physical data mover platform; and wherein booting the replacement VDM includes:
in response to restoration of power to the first physical data mover platform, automatically instantiating the replacement VDM on the first physical data mover platform.

7. A method as in claim 3 wherein the VDM failover event causes creation of a secondary VDM on the second physical data mover platform, the secondary VDM managing host computer access to the second copy of the data that resides on the second storage array; and wherein performing the network interface control operation includes:
accessing configuration data from the configuration file, and
based on the configuration data, disabling the set of network interfaces of the replacement VDM to prevent a conflict with a set of network interfaces of the secondary VDM.

8. A method as in claim 7 wherein accessing the configuration data from the configuration file includes:
reading a set of flags from the configuration file, the set of flags indicating that the set of network interfaces of the replacement VDM should not be enabled, the set of flags having been set in response to creation of a replication session that replicates changes to the first copy of the data that resides on the first storage array to the second copy of the data that resides on the second storage array.

9. A method as in claim 8 wherein disabling the set of network interfaces of the replacement VDM includes:
creating the set of network interfaces of the replacement VDM, and
placing each network interface of the set of network interfaces of the replacement VDM in a "DOWN" state that disables that network interface of the set of network interfaces of the replacement VDM, while each network interface of the set of network interfaces of the secondary VDM in an "UP" state that enables that network interface of the set of network interfaces of the secondary VDM.

10. A method as in claim 3 wherein each network interface is defined by a respective Internet Protocol (IP) address through which an external host computer accesses at least a portion of the data over a computerized network.

11. A method as in claim 1, further comprising:
after performing the network interface control operation that controls the availability of the network interfaces provided by the replacement VDM, (i) performing a check operation that determines whether the replacement VDM is on a standby side or an active side, (ii) permanently setting the set of network interfaces of the replacement VDM to a disabled state when the check operation indicates that the replacement VDM is on the standby side, and (iii) setting the network interfaces of the replacement VDM to an enabled state when the check operation indicates that the replacement VDM is on the active side.

12. Data storage equipment, comprising:
memory; and
control circuitry coupled to the memory, the memory storing instructions which, when carried out by the control circuitry, cause the control circuitry to:

electronically adjust a configuration file on a first physical data mover platform to indicate whether data managed by an initial virtual data mover (VDM) on the first physical data mover platform is being replicated from the first physical data mover platform to a second physical data mover platform, following a VDM failover event in which the initial VDM on the first physical data mover platform fails, electronically create a replacement VDM on the first physical data mover platform to replace the initial VDM, and after the replacement VDM is created, perform a network interface control operation that controls availability of network interfaces provided by the replacement VDM, the network interface control operation (i) enabling a set of network interfaces of the replacement VDM when the network interface control operation determines from the configuration file that the data managed by the initial VDM on the first physical data mover platform was not being replicated from the first physical data mover platform to the second physical data mover platform at the time of the VDM failover event, and (ii) disabling the set of network interfaces of the replacement VDM when the network interface control operation determines from the configuration file that the data managed by the initial VDM on the first physical data mover platform was being replicated from the first physical data mover platform to the second physical data mover platform at the time of the VDM failover event.

13. Data storage equipment as in claim 12 wherein a first copy of the data resides on a first storage array that is coupled to the first physical data mover platform; wherein the initial VDM initially manages the first copy of the data as a production version; and wherein the control circuitry is further constructed and arranged to:

prior to the failover event, enable a set of network interfaces of the initial VDM to provide host computer access to the first copy of the data that resides on the first storage array.

14. Data storage equipment as in claim 13 wherein a second copy of the data resides on a second storage array that is coupled to the second physical data mover platform, the second copy of the data initially forming a secondary version; and wherein the control circuitry is further constructed and arranged to:

prior to the failover event, provide a replication service between the first physical data mover platform and the second physical data mover platform, the replication service replicating changes to the first copy of the data that resides on the first storage array to the second copy of the data that resides on the second storage array.

15. A method as in claim 14 wherein each network interface is defined by a respective Internet Protocol (IP) address through which an external host computer accesses at least a portion of the data over a computerized network.

16. A computer program product having a non-transitory computer readable medium which stores a set of instructions to handle a virtual data mover (VDM) failover situation, the set of instructions, when carried out by computerized circuitry, causing the computerized circuitry to perform a method of:

electronically adjusting a configuration file on a first physical data mover platform to indicate whether data managed by an initial VDM on the first physical data mover platform is being replicated from the first physical data mover platform to a second physical data mover platform;

following a VDM failover event in which the initial VDM on the first physical data mover platform fails, electronically creating a replacement VDM on the first physical data mover platform to replace the initial VDM; and after the replacement VDM is created, performing a network interface control operation that controls availability of network interfaces provided by the replacement VDM, the network interface control operation (i) enabling a set of network interfaces of the replacement VDM when the network interface control operation determines from the configuration file that the data managed by the initial VDM on the first physical data mover platform was not being replicated from the first physical data mover platform to the second physical data mover platform at the time of the VDM failover event, and (ii) disabling the set of network interfaces of the replacement VDM when the network interface control operation determines from the configuration file that the data managed by the initial VDM on the first physical data mover platform was being replicated from the first physical data mover platform to the second physical data mover platform at the time of the VDM failover event.

17. A computer program product as in claim 16 wherein each network interface is defined by a respective Internet Protocol (IP) address through which an external host computer accesses at least a portion of the data over a computerized network.

18. A computer program product as in claim 17 wherein a first copy of the data resides on a first storage array that is coupled to the first physical data mover platform; wherein the initial VDM initially manages the first copy of the data as a production version; and wherein the method further comprises:

prior to the failover event, enabling a set of network interfaces of the initial VDM to provide host computer access to the first copy of the data that resides on the first storage array.

19. A computer program product as in claim 18 wherein a second copy of the data resides on a second storage array that is coupled to the second physical data mover platform, the second copy of the data initially forming a secondary version; and wherein the method further comprises:

prior to the failover event, providing a replication service between the first physical data mover platform and the second physical data mover platform, the replication service replicating changes to the first copy of the data that resides on the first storage array to the second copy of the data that resides on the second storage array.

20. A computer program product as in claim 19 wherein the VDM failover event causes creation of a secondary VDM on the second physical data mover platform, the secondary VDM managing host computer access to the second copy of the data that resides on the second storage array; and wherein performing the network interface control operation includes:

accessing configuration data from the configuration file, and based on the configuration data, disabling the set of network interfaces of the replacement VDM to prevent a conflict with a set of network interfaces of the secondary VDM.

* * * * *